United States Patent
Shida

(10) Patent No.: US 8,949,615 B2
(45) Date of Patent: Feb. 3, 2015

(54) INFORMATION PROCESSING APPARATUS, INFORMATION PROCESSING METHOD, AND COMPUTER READABLE MEDIUM

(75) Inventor: Hiroshi Shida, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 81 days.

(21) Appl. No.: 13/166,408

(22) Filed: Jun. 22, 2011

(65) Prior Publication Data

US 2012/0117387 A1    May 10, 2012

(30) Foreign Application Priority Data

Nov. 5, 2010   (JP) ................................ 2010-248491

(51) Int. Cl.
*G06F 21/00*  (2013.01)
*G06F 21/85*  (2013.01)
*G06F 21/74*  (2013.01)

(52) U.S. Cl.
CPC ............ *G06F 21/85* (2013.01); *G06F 21/74* (2013.01); *G06F 2221/2101* (2013.01); *G06F 2221/2105* (2013.01); *G06F 2221/2143* (2013.01); *G06F 2221/2107* (2013.01)
USPC ........................................................ 713/182

(58) Field of Classification Search
USPC ........................................................ 713/182
See application file for complete search history.

(56) References Cited

U.S. PATENT DOCUMENTS

| | | | | |
|---|---|---|---|---|
| 6,353,889 | B1 * | 3/2002 | Hollingshead | 713/169 |
| 7,155,413 | B2 | 12/2006 | Nakai et al. | |
| 7,263,612 | B2 * | 8/2007 | Yamazaki et al. | 713/168 |
| 2007/0234059 | A1 * | 10/2007 | Ohara | 713/176 |
| 2008/0104401 | A1 * | 5/2008 | Miyamoto et al. | 713/175 |

* cited by examiner

*Primary Examiner* — Esther Benoit
(74) *Attorney, Agent, or Firm* — Sughrue Mion, PLLC

(57) ABSTRACT

An information processing apparatus includes an accepting unit, a memory, an activating unit, and a controller. The accepting unit accepts first key information and second key information. The first key information includes performance information representing a performance and an identifier for identifying a device. The second key information includes the performance information and temporary use permission information. The memory stores the performance information in the first key information if the first key information is accepted and if the identifier is a predetermined identifier, and stores the temporary use permission information and the performance information in the second key information if the second key information is accepted. The activating unit activates the device with the performance represented by the performance information. The controller controls the activating unit to activate the device with the performance and then performs control to erase the performance information and the temporary use permission information.

8 Claims, 3 Drawing Sheets

INFORMATION PROCESSING APPARATUS, INFORMATION PROCESSING METHOD, AND COMPUTER READABLE MEDIUM

CROSS-REFERENCE TO RELATED APPLICATIONS

This application is based on and claims priority under 35 USC 119 from Japanese Patent Application No. 2010-248491 filed Nov. 5, 2010.

BACKGROUND (i) Technical Field

The present invention relates to an information processing apparatus, an information processing method, and a computer readable medium.

SUMMARY

According to an aspect of the invention, there is provided an information processing apparatus including: an accepting unit that accepts first key information and second key information, the first key information including performance information representing a performance for which a user agrees to contract with respect to a device and an identifier for identifying the device, the second key information including the performance information and temporary use permission information representing permission for temporary use of the device with the performance; a memory that stores the performance information included in the first key information if the first key information is accepted by the accepting unit and if the identifier included in the first key information is a predetermined identifier, and that stores the temporary use permission information and the performance information included in the second key information if the second key information is accepted by the accepting unit; an activating unit that activates the device with the performance represented by the performance information if the performance information is stored in the memory, if the temporary use permission information is not stored in the memory, and if an instruction to activate the device is provided; and a controller that controls the activating unit to activate the device with the performance represented by the performance information and then performs control to erase the performance information and the temporary use permission information from the memory if the performance information and the temporary use permission information are stored in the memory and if an instruction to activate the device is provided.

BRIEF DESCRIPTION OF THE DRAWINGS

Exemplary embodiment(s) of the present invention will be described in detail based on the following figures, wherein.

DETAILED DESCRIPTION

Hereinafter, an exemplary embodiment of the present invention will be described in detail with reference to the attached drawings.

Figure 1:
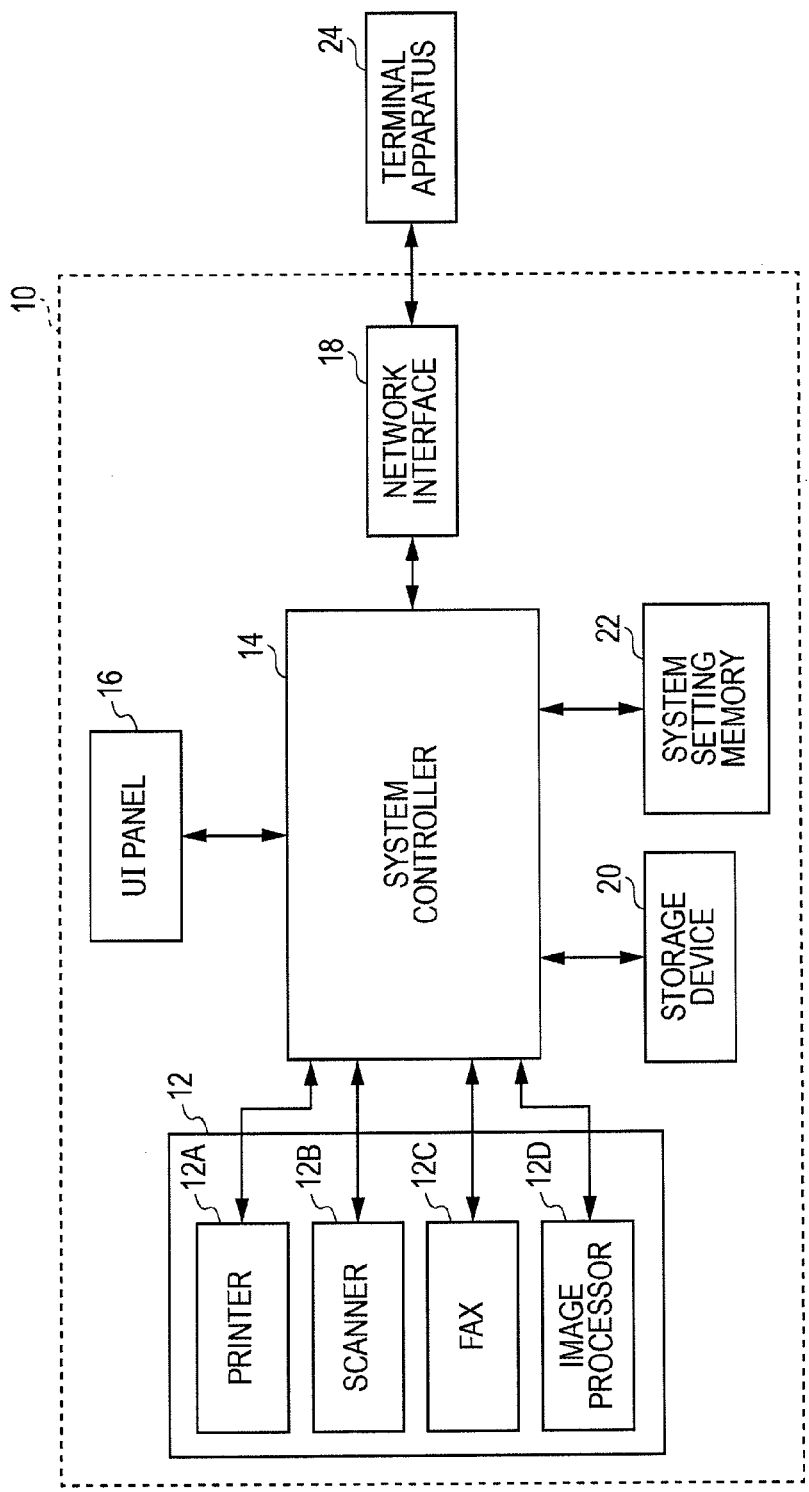
FIG. 1 is a block diagram illustrating an example of a configuration of an image processing output apparatus according to an exemplary embodiment of the present invention.

FIG. 1 is a block diagram illustrating an example schematic configuration of an image processing output apparatus 10 according to the exemplary embodiment. As illustrated in FIG. 1, the image processing output apparatus 10 includes an image processing output unit 12, a system controller 14, a user interface (UI) panel 16, a network interface 18, a storage device 20, and a system setting memory 22.

The image processing output unit 12 receives image information representing an image, performs predetermined processing on the image information, and outputs the processed image information. Specifically, the image processing output unit 12 includes a printer 12A, a scanner 12B, a facsimile machine (FAX) 12C, and an image processor 12D.

The printer 12A forms an image represented by image information input thereto on recording paper serving as a recording medium. In this exemplary embodiment, a xerography printer is used as the printer 12A. Alternatively, an inkjet printer, a thermal printer, a dot impact printer, or the like may be used instead of the xerography printer.

The scanner 12B scans a document using an image sensor, thereby obtaining image information. In this exemplary embodiment, a flathead scanner provided with an auto document feeder (ADF) is used as the scanner 12B. This is an image scanner based on a charge-coupled device (CCD) optical reduction scheme. Alternatively, a handy image scanner or a drum-type image scanner may be used. Furthermore, instead of the image scanner based on the CCD optical reduction scheme, an image scanner having an imaging device other than the CCD, such as an image scanner based on a contact image sensor (CIS) scheme, may be used.

The FAX 12C transmits image information read by the scanner 12B to an external communication apparatus (not illustrated) via a communication medium (e.g., public telephone network). Also, the FAX 12C receives image information transmitted from an external communication apparatus, and records an image represented by the received image information on recording paper using the printer 12A.

The image processor 12D performs predetermined image processing on image information that is obtained through scanning performed by the scanner 12B or image information input from an external apparatus. Specifically, the image processor 12D performs image processing on the basis of image information, such as a color/temperature correction process, an image density conversion process, a hyper-tone process, a hyper-sharpness process, special image processing, and a magnification change process.

The system controller 14 includes a computer having a central processing unit (CPU), a read only memory (ROM), and a random access memory (RAM). The CPU controls the entire image processing output apparatus 10 by executing processing of various programs. The ROM serves as a storage medium, in which a control program for controlling the operation of the image processing output apparatus 10, a contract agreement process program (described below), and various parameters are stored in advance. The RAM serves as a storage medium used as a work area or the like during execution of various programs.

The UI panel 16 is constituted by a touch panel display or the like in which a transmissive touch panel is superposed on a display. Various types of information is displayed on the display screen of the display. A user may input desired information or instructions by touching the touch panel. In this exemplary embodiment, encrypted first key information and second key information (described below) are input, an instruction to start image formation by the printer 12A is provided, an instruction to start reading a document by the scanner 12B is provided, various settings of image processing performed on image information obtained by the scanner 12B are performed, and an instruction to start transmission/reception of image information by the FAX 12C is provided by a user using the UI panel 16.

In this exemplary embodiment, the first key information is key information that includes performance information representing a contract regarding the image processing output unit 12 agreed to by a user of the image processing output unit 12 (for example, the level of a processing ability given to the image processing output unit 12, a device permitted to be used among the plural devices included in the image processing output unit 12 (printer 12A, scanner 12B, and FAX 12C)), and an identifier for identifying the image processing output unit 12 (here, for example, a unique identifier assigned to the image processing output apparatus 10 in order to identify the image processing output apparatus 10). The second key information is key information that includes temporary use permission information for permitting a user to temporarily use the image processing output unit 12, performance information, and an identifier. Hereinafter, the first key information and the second key information will be simply referred to as "key information" when it is not necessary to distinguish between them. That is, in the image processing output apparatus 10 according to this exemplary embodiment, it is necessary as a precondition for using the image processing output unit 12 that encrypted first key information or second key information is accepted by the UI panel 16.

The network interface 18 is connected to a communication medium (for example, a local area network (LAN)) and is used for transmitting/receiving various types of information to/from a terminal apparatus (for example, a personal computer) via the communication medium.

The storage device 20 is constituted by an auxiliary memory (for example, a hard disk device), stores image information to be processed by and output from the image processing output unit 12 and data used for setting various settings, and also stores the unique identifier assigned to the image processing output apparatus 10 for identifying the image processing output apparatus 10.

The system setting memory 22 is constituted by an auxiliary memory (for example, a flash memory), and stores performance information representing the performance of the image processing output unit 12 for which a user has agreed to contract, and temporary use permission information representing the permission for temporary use of the image processing output unit 12 with the performance.

The printer 12A, the scanner 12B, the FAX 12C, the image processor 12D, the UI panel 16, the network interface 18, the memory 12, and the system setting memory 22 are connected to the system controller 14. Accordingly, the system controller 14 performs access to the storage device 20 and the system setting memory 22, acquisition of various types of information from the printer 12A, the scanner 12B, the FAX 12C, and the image processor 12D, control of the operation of the printer 12A, the scanner 12B, the FAX 12C, and the image processor 12D, display of various types of information on the UI panel 16, recognition of instructions provided by a user to the UI panel 16, and transmission/reception of various types of information to/from the terminal apparatus 24 via the network interface 18.

Next, an operation of the image processing output apparatus 10 according to this exemplary embodiment will be described.

First, a description will be given of a case where the image processing output unit 12 has already been activated in a state where performance information is stored in the system setting memory 22.

In the image processing output apparatus 10, when a request for using the image processing output unit 12 is input by a user via the UI panel 16 (when an instruction to start activating the image processing output unit 12 is provided), the image processing output unit 12 is activated with the performance represented by the performance information stored in the system setting memory 22. For example, if the processing speed of the image processing output unit 12 is determined by the performance information, the image processing output unit 12 is activated so that processing is executed at the processing speed in the image processing output unit 12. Also, if the device the use of which is permitted is determined by the performance information among the devices included in the image processing output unit 12 (printer 12A, scanner 12B, and FAX 12C), the image processing output unit 12 is activated so that the device may be used, and a screen showing the information representing the device is displayed as a screen allowing the user to request the use of the device on the UI panel 16.

For example, if the use of the printer 12A, the scanner 12B, and the FAX 12C included in the image processing output unit 12 is permitted by the performance information, figures representing the printer 12A, the scanner 12B, and the FAX 12C are displayed on the UI panel 16.

When the figure representing the printer 12A is specified (request for using the printer 12A is given) by a user via the UI panel 16 and when image information is input from the terminal apparatus 24, predetermined image processing is performed on the image information by the image processor 12D, so that an image corresponding to the processed image information is formed on recording paper by the printer 12A.

When the figure representing the scanner 12B is specified (request for using the scanner 12B is given) by a user via the UI panel 16 and when an instruction to start scanning is accepted by the UI panel 16 in a state where a document is placed at a specific position on a predetermined document table (not illustrated) of the scanner 12B, the document is scanned using the image sensor of the scanner 12B to obtain image information. Then, the obtained image information undergoes predetermined image processing performed by the image processor 12D, is output to a predetermined device (for example, the storage device 20), and is stored in a predetermined storage area.

When the figure representing the FAX 12C is specified (request for using the FAX 12C is given) by a user via the UI panel 16 and when an instruction to start FAX transmission is accepted by the UI panel 16 in a state where a document to be transmitted is placed on an auto document feeder (not illustrated) of the FAX 12C after the destination has been specified, the document is scanned using the image sensor of the scanner 12B to obtain image information. Then, the obtained image information undergoes predetermined image processing performed by the image processor 12D, and the processed image information is transmitted to the specified destination.

In the image processing output apparatus 10 according to this exemplary embodiment, when image information transmitted from an external communication apparatus is received by the FAX 12C, the received image information undergoes predetermined image processing performed by the image processor 12D, and an image represented by the processed image information is formed on recording paper by the printer 12A.

In order to use the image processing output unit 12 of the image processing output apparatus 10 in the above-described manner, it is necessary to store performance information in the system setting memory 22. Therefore, according to the related art, key information corresponding to the first key information is input, and the performance information included in the key information is stored in the system setting memory 22. A state where performance information is stored in the system setting memory 22 means that a contract regarding the performance of the image processing output apparatus 10 (in this exemplary embodiment, the image processing output unit 12) has been agreed to between a user and a seller (or a manufacturer/seller or manufacturer). In contrast, a state where performance information is not stored in the system setting memory 22 means that a contract regarding the performance of the image processing output apparatus 10 has not been agreed to between a user and a seller (or a manufacturer/seller or manufacturer). In other words, the user of the image processing output apparatus 10 is not permitted to use the image processing output apparatus 10 if the user has not agreed to a contract with a seller (or a manufacturer/seller or manufacturer) regarding the performance of the image processing output apparatus 10.

The key information to be input to the image processing output apparatus 10 is encrypted on the basis of a predetermined algorithm. The predetermined algorithm may be a widely used encryption scheme or may be an individually developed encryption scheme.

The user inputs encrypted key information (hereinafter referred to as "encrypted key") via the UI panel 16 after turning on the power switch (not illustrated) of the image processing output apparatus 10. The encrypted key input to the image processing output apparatus 10 is used by being decrypted into key information.

Situations in which the encrypted key is input to the image processing output apparatus 10 include the following two typical situations: a situation in which a user who is the manufacturer performs a test for checking the performance of the image processing output apparatus 10 (for example, spot test) before shipment of the image processing output apparatus 10; and a situation in which a user who is the end user actually uses the image processing output apparatus 10 after the shipment. In a case where the manufacturer performs a test on the image processing output apparatus 10 before shipment, it is necessary to store performance information in the system setting memory 22 and to activate the image processing output unit 12 with the performance represented by the performance information in order to activate the image processing output unit 12 of the image processing output apparatus 10. In this case, however, the image processing output unit 12 is activated to perform a test before shipment. Therefore, after the test has ended, it is necessary to erase the performance information from the system setting memory 22 before shipment so that performance information may be set by an end user, but this erasing work is troublesome. Furthermore, this work may be put off due to the troublesomeness, resulting in the apparatus being shipped without the performance information being erased from the system setting memory 22 in some cases.

Accordingly, in the image processing output apparatus 10 according to this exemplary embodiment, a contract agreement process is executed to reduce inconvenience of erasing performance information from the system setting memory 22.

Figure 2:
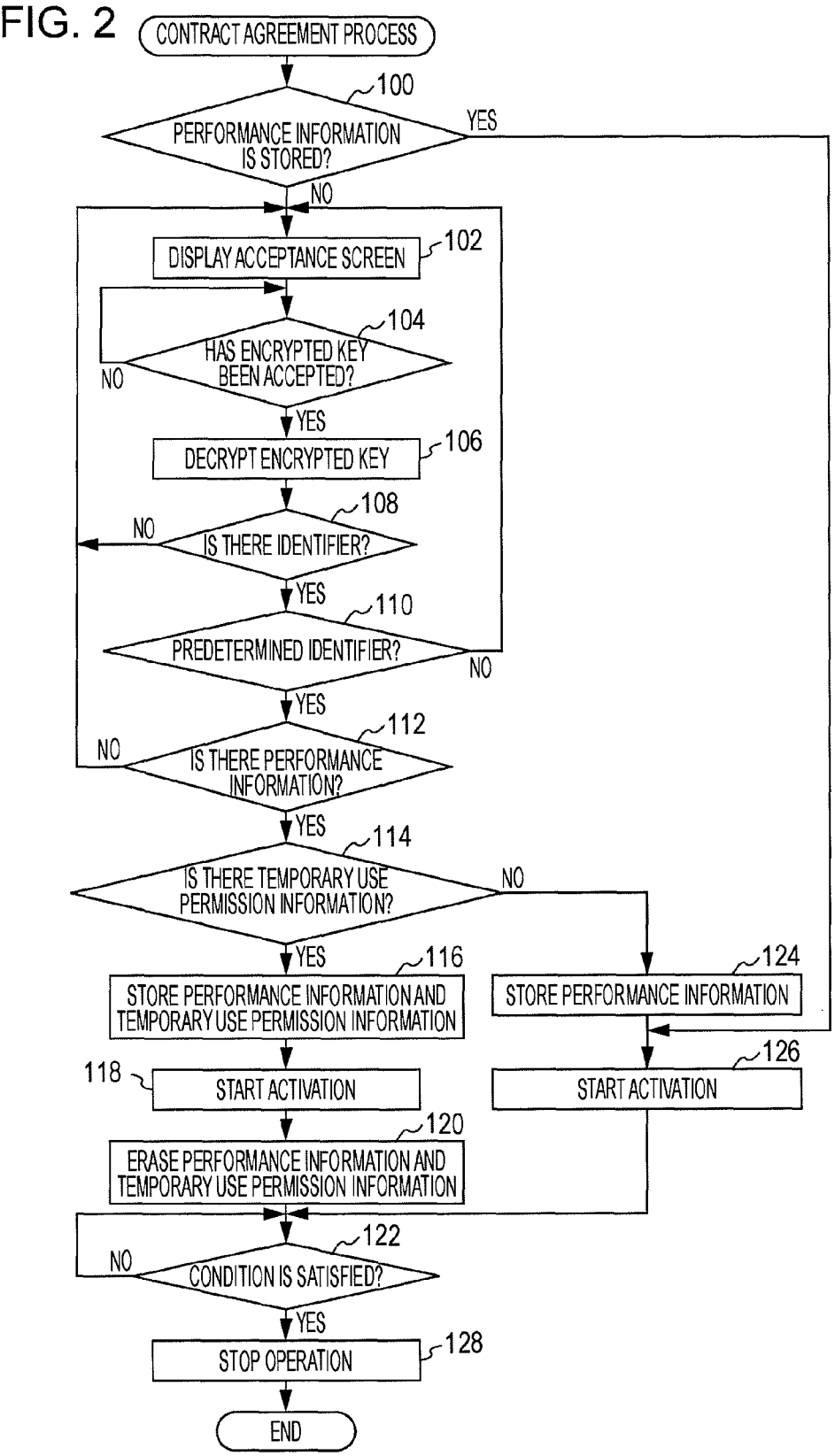
FIG. 2 is a flowchart illustrating a procedure of a process of a contract agreement process program according to the exemplary embodiment.

Hereinafter, the operation of the image processing output apparatus 10 during execution of the contract agreement process will be described with reference to FIG. 2. FIG. 2 is a flowchart illustrating a process of a contract agreement process program executed by the system controller 14 when an activation start instruction to start activation of the image processing output unit 12 is accepted by the UI panel 16. Here, in order to avoid complexity, description will be given of a case where the image information to be processed by the image processing output unit 12 has already been stored in the storage device 20. Also, hereinafter, encrypted first key information is referred to as "first encrypted key", and encrypted second key information is referred to as "second encrypted key". When it is not necessary to distinguish between the first encrypted key and the second encrypted key, these keys will be simply referred to as "encrypted keys".

In step 100 in FIG. 2, it is determined whether or not performance information is stored in the system setting memory 22. If a positive determination is made, the process proceeds to step 126. If a negative determination is made, the process proceeds to step 102, where an acceptance screen for allowing the user to input an encrypted key is displayed on the UI panel 16. Then, the process proceeds to step 104, where it is determined whether or not an encrypted key has been accepted by the UI panel 16. Note that, in step 102, an acceptance screen for allowing the user to input the first encrypted key is displayed on the UI panel 16 if the second encrypted key has been input before but the first encrypted key has not been input before, whereas an acceptance screen for allowing the user to simply input an "encrypted key" is displayed on the UI panel 16 if neither the first encrypted key nor the second encrypted key has been input before. Alternatively, an acceptance screen for allowing the user to input an "encrypted key" may be displayed on the UI panel 16 if neither the first encrypted key nor the second encrypted key has been input before regardless of whether or not the second encrypted key has been input before. Alternatively, a screen for allowing the user to input any of the first encrypted key and the second encrypted key may be displayed every time an instruction to perform activation is input until activation has been performed at least twice.

Figure 3:
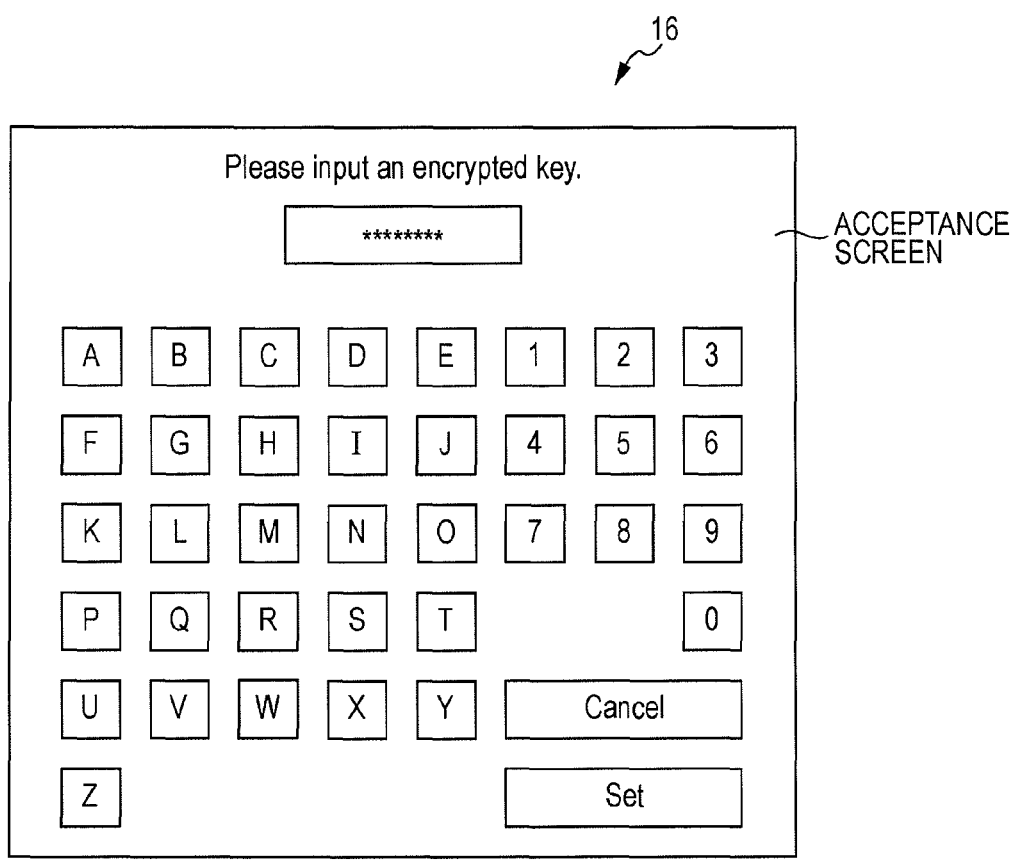
FIG. 3 is a schematic diagram illustrating an example of an acceptance screen displayed on a UI panel of the image processing output apparatus according to the exemplary embodiment.

FIG. 3 is a schematic diagram illustrating an example of the acceptance screen displayed on the UI panel 16. As illustrated in FIG. 3, a message "Please input an encrypted key." is displayed on the acceptance screen of the UI panel 16. Also, a keyboard having alphabetic characters and numeric characters 0 through 9 with which an encrypted key is represented is displayed thereon. If alphabetic characters or numeric characters are accepted on the acceptance screen via the keyboard, the accepted alphabetic characters or numeric characters are displayed one by one in the form of asterisks (*) in a blank field at the center of the screen. Furthermore, a cancel button for erasing the characters accepted as an encrypted key from the field to cancel the input, and a set button for setting the accepted characters as an encrypted key are displayed on the acceptance screen. The user inputs the encrypted key that is uniquely determined for the image processing output apparatus 10 using the keyboard and the cancel button displayed on the acceptance screen of the UI panel 16, and then presses the set button. Accordingly, a positive determination is made in step 104, and the process proceeds to step 106.

In step 106, the encrypted key accepted in step 104 is decrypted. If the first encrypted key is accepted in step 104 and if the first encrypted key is decrypted in step 106, the identifier and performance information are restored. If the second encrypted key is accepted in step 104 and if the second encrypted key is decrypted in step 106, the identifier, performance information, and temporary use permission information are restored.

In step 108, it is determined whether or not the identifier is included in the information obtained through the decryption performed in step 106. If a negative determination is made, the process returns to step 102. If a positive determination is made, the process proceeds to step 110.

In step 110, it is determined whether or not the identifier obtained through the decryption performed in step 106 is the predetermined identifier stored in the storage device 20, that is, whether or not the identifier is the identifier uniquely determined for the image processing output apparatus 10. If a negative determination is made, the process returns to step 102. If a positive determination is made, the process proceeds to step 112.

In step 112, it is determined whether or not the performance information is included in the information obtained through the decryption performed in step 106. If a negative determination is made, the process returns to step 102. If a positive determination is made, the process proceeds to step 114.

In step 114, it is determined whether or not the temporary use permission information is included in the information obtained through the decryption performed in step 106. If a positive determination is made, the process proceeds to step 116, where the performance information and the temporary use permission information obtained through the decryption performed in step 106 are stored in the system setting memory 22. Then, the process proceeds to step 118.

In step 118, the image processing output unit 12 is activated with the performance represented by the performance information stored in the system setting memory 22 in step 116. Then, the process proceeds to step 120, where the performance information and the temporary use permission information are erased from the system setting memory 22. Then, the process proceeds to step 122.

On the other hand, if a negative determination is made in step 114, the process proceeds to step 124, where the performance information obtained through the decryption performed in step 106 is stored in the system setting memory 22. Then, the process proceeds to step 126. After the performance information is stored in the system setting memory 22 in step 124, the performance information is not erased from the system setting memory 22 and is kept stored therein. That is, after the performance information is stored in the system setting memory 22 in step 124, the system setting memory 22 is controlled by the system controller 14 so that the performance information is not erased therefrom even if the power of the image processing output apparatus 10 is turned off or even if an instruction is accepted by the UI panel 16. Also, after the performance information is stored in the system setting memory 22 in step 124, control is performed by the system controller 14 so that, even if any of the first key information and the second key information is input, the input is cancelled (so that performance information is not stored in the system setting memory 22).

In step 126, the image processing output unit 12 is activated with the performance represented by the performance information stored in the system setting memory 22 in step 124, and the process proceeds to step 122.

In step 122, it is determined whether or not a condition for stopping the operation of the image processing output unit 12 is satisfied (for example, any of a condition in which an instruction to stop the operation of the image processing output unit 12 has been accepted by the UI panel 16, a condition in which a predetermined process and output performed on image information by the image processing output unit 12 have ended, and a condition in which the power of the image processing output apparatus 10 has been turned off). If a positive determination is made, the process proceeds to step 128, where the operation of the image processing output unit 12 is stopped. Then, the contract agreement process program ends.

In the above-described exemplary embodiment, an example of encrypting key information is described. However, the key information is not necessarily encrypted. In this case, decryption of an encrypted key is not necessary in the image processing output apparatus 10. Note that, in view of security, it is appropriate that at least an identifier in the information included in the key information is encrypted. Also, in a case where plural contracts exist for a common apparatus (in the above exemplary embodiment, the image processing output apparatus 10), if devices for the individual contracts are prepared as stock, the cost for managing the stock increases. Therefore, by using an encrypted key that is obtained by encrypting entire key information when using a device, as described above in the exemplary embodiment, plural common devices are categorized into one type without depending on a contract status.

Also, in the above-described exemplary embodiment, an example of visibly displaying an acceptance screen on the UI panel 16 is described. Alternatively, an audio playback apparatus (for example, a speaker) for audibly displaying activation condition information representing that storing performance information in the system setting memory 22 is a condition for activating the image processing output unit 12 may be used. Alternatively, an image forming apparatus (for example, a printer) for permanently and visibly displaying activation condition information by forming it on recording paper may be used. Also, at least two of the UI panel 16, the foregoing audio playback apparatus, and the foregoing image forming apparatus may be combined to display activation condition information.

According to the above-described exemplary embodiment, if the performance information included in the first key information is once stored in the system setting memory 22, the acceptance screen is not displayed thereafter. Alternatively, the acceptance screen may be displayed on the UI panel 16 every time an instruction to activate the image processing output unit 12 is input to the image processing output apparatus 10. In this case, the performance information may be erased from the system setting memory 22 every time the image processing output unit 12 is used.

According to the above-described exemplary embodiment, the image processing output unit 12 of the image processing output apparatus 10 is not activated by using the second key information for the second time. Alternatively, the image processing output unit 12 of the image processing output apparatus 10 may be activated by using the second key information any number of times. In this case, step 100 of the foregoing contract agreement process program is not performed, and the performance information stored in the system setting memory 22 in step 124 is erased from the system setting memory 22 every time the operation of the image processing output unit 12 ends.

According to the above-described exemplary embodiment, the second key information includes an identifier, performance information, and temporary use permission information. However, the second key information may not necessarily include the identifier. In this case, determination of whether or not an identifier is a predetermined identifier may not be made for the second key information in the foregoing contract agreement process, and identification of the second key information may be simply performed.

According to the above-described exemplary embodiment, the contract agreement process program is stored in advance in the ROM. Alternatively, the program may be provided by being stored in a computer readable recording medium, such as a compact disc read only memory (CD-ROM), a digital versatile disc read only memory (DVD-ROM), or a universal serial bus (USB) memory. Alternatively, the program may be distributed via a wired or wireless communication medium.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
an acceptor that accepts first key information and second key information, the first key information including performance information representing a performance for which a first user and a second user agree to contract with respect to a device and an identifier for identifying the device; the second key information including the performance information and temporary use permission information representing permission for temporary use of the device with the performance;
a memory that stores the performance information included in the first key information in response to: (a) the first key information being accepted by the acceptor and (b) determining that the identifier included in the first key information is a predetermined identifier; and that stores the temporary use permission information and the performance information included in the second key information in response to the second key information being accepted by the acceptor;
an activator that activates the device with the performance represented by the performance information in response to: (c) determining that the first user has entered the first key information into the acceptor by determining that the performance information is stored in the memory, (d) determining that the temporary use permission information is not stored in the memory, and (e) determining that an instruction to activate the device is provided; and
a controller that controls the activator to activate the device with the performance represented by the performance information and then performs control to erase the performance information and the temporary use permission information from the memory in response to: (f) determining that the second user has entered the second key information into the acceptor by determining that the performance information and the temporary use permission information are stored in the memory, and (g) determining that an instruction to activate the device is provided,
wherein the device serves as an image processing outputter that performs predetermined processing on image information inputted to the device, and outputs the processed image information, and
wherein the performance information comprises information that controls the image processing outputter to perform the predetermined processing.

2. The information processing apparatus according to claim 1,
wherein the acceptor accepts the first key information in which at least the identifier among the performance information and the identifier is encrypted in advance, and the second key information in which at least one of the temporary use permission information and the performance information is encrypted in advance,
the information processing apparatus further comprising:
a decryptor that decrypts encrypted information included in each of the first key information and the second key information accepted by the acceptor.

3. The information processing apparatus according to claim 1, further comprising:
a display that displays activation condition information representing that storing the performance information in the memory is a condition necessary for activating the device in response to: (h) determining that an instruction to activate the device is provided without the performance information being stored in the memory and (i) determining that the device has not been activated by the activator up to the present.

4. The information processing apparatus according to claim 3,
wherein the controller further controls the display to display, as the activation condition information, information representing that storing the performance information included in the first key information in the memory is a condition necessary for activating the device, in response to: (j) determining that an instruction to activate the device is provided without the performance information being stored in the memory and (k) determining that the device has been activated by the activator with the performance represented by the performance information included in the second key information up to the present but the device has not been activated by the activator with the performance represented by the performance information included in the first key information up to the present.

5. The information processing apparatus according to claim 1,
wherein the controller further performs control so that, in response to determining that the device is activated by the activator with the performance represented by the performance information included in the first key information stored in the memory, a state where the performance information is stored in the memory is maintained thereafter.

6. The information processing apparatus according to claim 1,
wherein the controller further performs control so that, in response to determining that the device is activated by the activator with the performance represented by the performance information included in the first key information stored in the memory, the temporary use permission information is not stored in the memory thereafter.

7. An information processing method comprising:
accepting first key information and second key information, the first key information including performance information representing a performance for which a first user and a second user agree to contract with respect to a device and an identifier for identifying the device; the second key information including the performance information and temporary use permission information representing permission for temporary use of the device with the performance;

storing the performance information included in the first key information in response to: (a) the first key information being accepted and (b) determining that the identifier included in the first key information is a predetermined identifier; and storing the temporary use permission information and the performance information included in the second key information in response to the second key information being accepted;

activating the device with the performance represented by the performance information in response to: (c) determining that the first user has entered the first key information by determining that the performance information is stored, (d) determining that the temporary use permission information is not stored, and (e) determining that an instruction to activate the device is provided; and performing control to activate the device with the performance represented by the performance information and then performing control to erase the performance information and the temporary use permission information in response to: (f) determining that the second user has entered the second key information by determining that the performance information and the temporary use permission information are stored, and (g) determining that an instruction to activate the device is provided, wherein the device serves as an image processing outputter that performs predetermined processing on image information inputted to the device and outputs the processed image information, and wherein the performance information comprises information that controls the image processing outputter to perform the predetermined processing.

8. A non-transitory computer readable medium storing a program causing a computer to execute a process, the process comprising:

accepting first key information and second key information, the first key information including performance information representing a performance for which a first user and a second user agree to contract with respect to a device and an identifier for identifying the device; the second key information including the performance information and temporary use permission information representing permission for temporary use of the device with the performance;

storing the performance information included in the first key information in response to: (a) the first key information being accepted and (b) determining that the identifier included in the first key information is a predetermined identifier; and storing the temporary use permission information and the performance information included in the second key information in response to the second key information being accepted;

activating the device with the performance represented by the performance information in response to: (c) determining that the first user has entered the first key information by determining that the performance information is stored, (d) determining that the temporary use permission information is not stored, and (e) determining that an instruction to activate the device is provided; and performing control to activate the device with the performance represented by the performance information and then performing control to erase the performance information and the temporary use permission information in response to: (f) determining that the second user has entered the second key information by determining that the performance information and the temporary use permission information are stored, and (g) determining that an instruction to activate the device is provided, wherein the device serves as an image processing outputter that performs predetermined processing on image information inputted to the device and outputs the processed image information, and wherein the performance information comprises information that controls the image processing outputter to perform the predetermined processing.

* * * * *